O. G. RIESKE.
DOUBLE DISK ATTACHMENT FOR DRILLS.
APPLICATION FILED JULY 14, 1910.

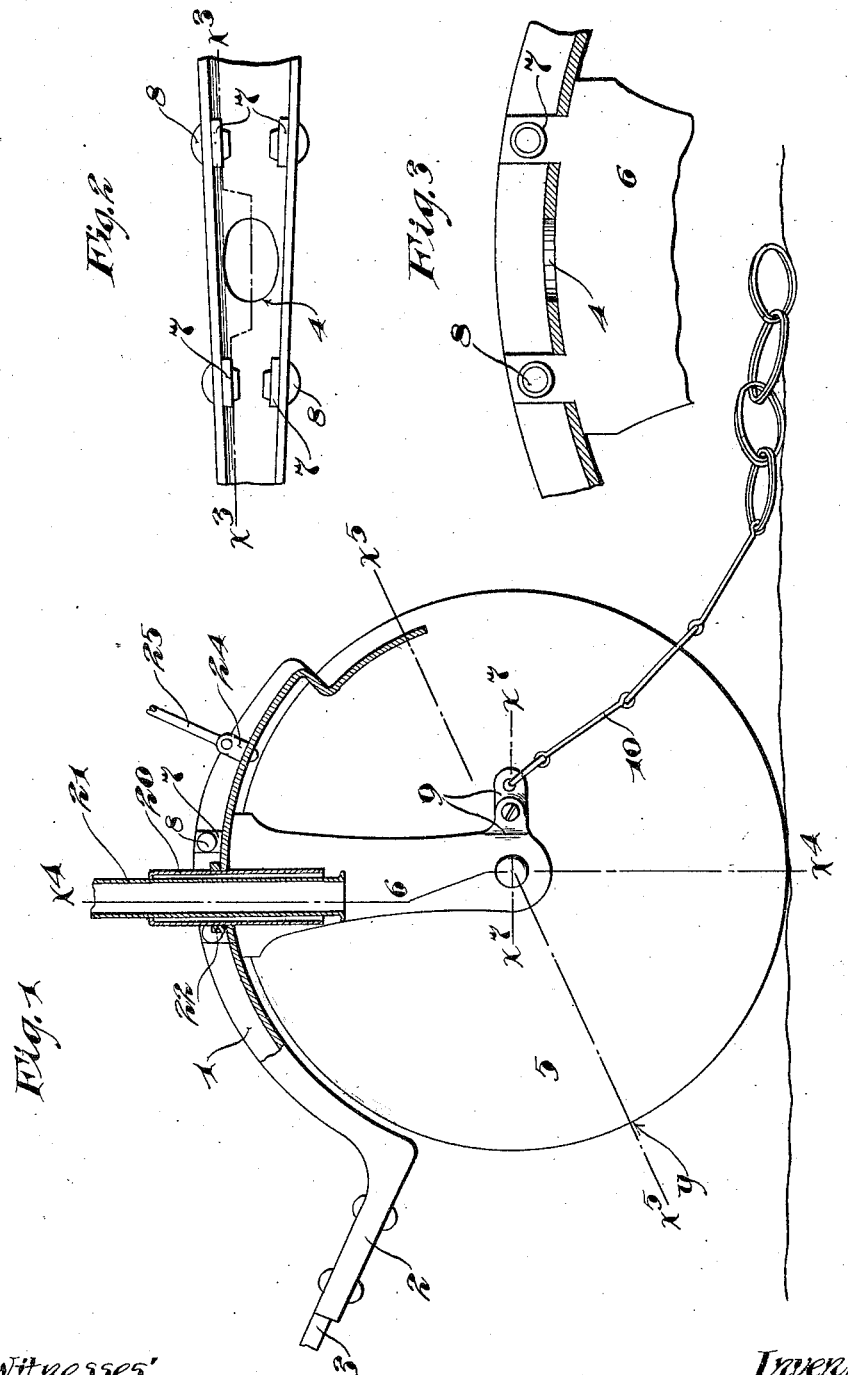

1,049,265.

Patented Dec. 31, 1912.

2 SHEETS—SHEET 2.

Witnesses:
E. C. Skinkle
A. H. Opsahl.

Inventor:
Otto George Rieske
By his Attorneys:
Williamson Merchant

UNITED STATES PATENT OFFICE.

OTTO G. RIESKE, OF ST. LOUIS PARK, MINNESOTA, ASSIGNOR TO THE MONITOR DRILL COMPANY, OF ST. LOUIS PARK, MINNEAPOLIS, MINNESOTA, A CORPORATION OF MINNESOTA.

DOUBLE-DISK ATTACHMENT FOR DRILLS.

1,049,265.     Specification of Letters Patent.     Patented Dec. 31, 1912.

Application filed July 14, 1910. Serial No. 571,917.

*To all whom it may concern:*

Be it known that I, OTTO G. RIESKE, a citizen of the United States, residing at St. Louis Park, in the county of Hennepin and State of Minnesota, have invented certain new and useful Improvements in Double-Disk Attachments for Drills; and I do hereby declare the following to be a full, clear, and exact description of the invention, such as will enable others skilled in the art to which it appertains to make and use the same.

My invention has for its object to provide an improved disk attachment for drills or seeding machines, and is in the nature of an improvement on, or modification of, the device disclosed and claimed in my pending application No. 534,967, filed December 27th, 1909, entitled disk attachment for drills.

The invention consists of the novel devices and combinations of devices hereinafter described and defined in the claims.

In the accompanying drawings which illustrate the invention, like characters indicate like parts throughout the several views.

Figure 8:
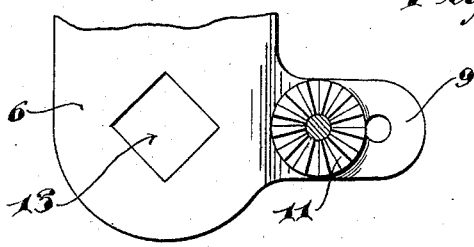
Figure 4:
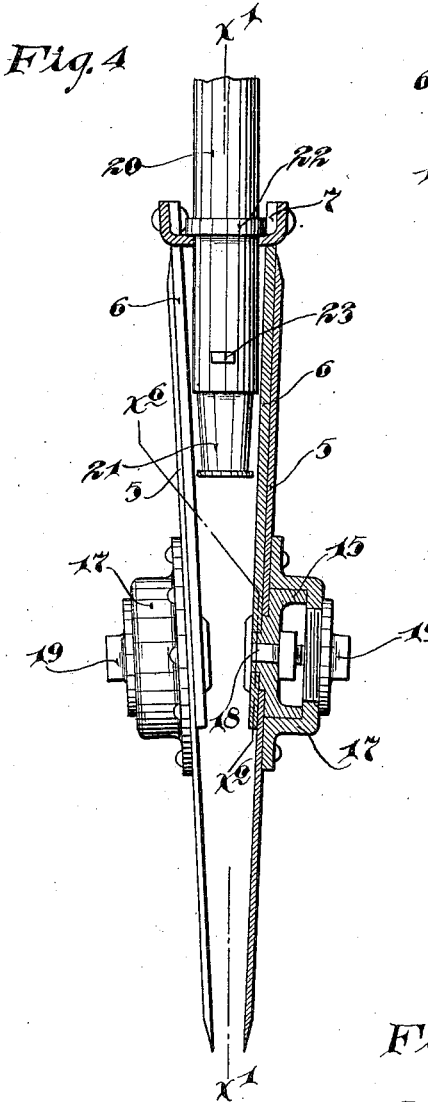
Figure 7:
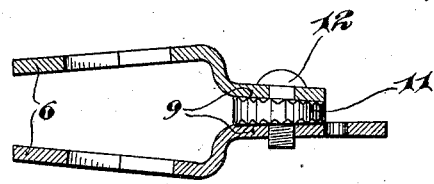
Figure 5:
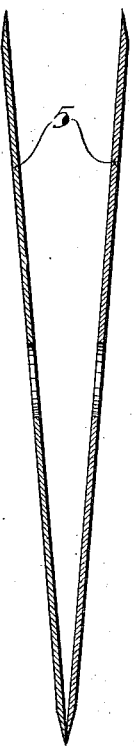
Figure 6:
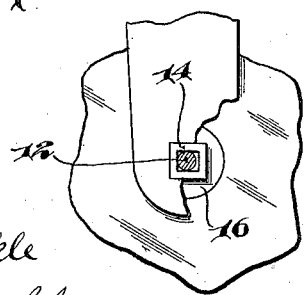

Referring to the drawings: Figure 1 is a vertical section taken from front toward the rear of the device on the line $x^1 x^1$ of Fig. 4; Fig. 2 is a fragmentary plan view of the shoe of the device; Fig. 3 is a vertical section taken on the line $x^3 x^3$ of Fig. 2, some parts being broken away; Fig. 4 is a transverse vertical section taken on the line $x^4 x^4$ of Fig. 1; Fig. 5 is a section through the disk taken on the line $x^5 x^5$ of Fig. 1 and showing the same removed from other parts of the device; Fig. 6 is a fragmentary view in section taken on the line $x^6 x^6$ of Fig. 4, some parts being broken away; Fig. 7 is a horizontal section taken on the line $x^7 x^7$ of Fig. 1, some parts being removed and some parts being shown in full; Fig. 8 is a detail in elevation showing several of the parts illustrated in detail in Fig. 7.

As one of its important features, this invention has for its object to provide a shoe for disk drills which may be constructed from sheet steel drop-forged, pressed, or otherwise formed from such metal. A shoe of this character may be made lighter, and at the same time, stronger than the cast shoe, and furthermore, may be produced with comparatively small cost. It has a further important advantage, that the foundry and molders are not required in its production and the work may be done, chiefly, by machines, the assembling of the parts, only, being hand operations.

The arched main body portion 1 of the seed boot is stamped or drop-forged from sheet steel, and, in cross section, is preferably made channel shape to give the same great strength, and is tapered in width in the direction from its rear toward its front end. At its front end it is bent abruptly forward to form a channel shape arm 2 to which an ordinary drag bar 3 is rigidly secured, preferably, by rivets. This channel shape body 1, at its central and upper portion, is formed with a large perforation 4, through which is passed a telescopically extensible seed delivery spout presently to be described.

The disks 5, which converge in the usual manner, are journaled to laterally spaced legs 6, which, in accordance with one feature of my present invention, are preferably separately constructed from sheet metal, preferably sheet steel, and are rigidly, but independently secured at their upper ends to the channel shape body 1 of the boot. These boot legs 6 may be secured to the boot body 1 in different ways, as for instance, rivets, bolts, or by welding. As an extremely and highly efficient way of accomplishing this result, however, the said boot legs 6 are provided at their upper ends with upwardly projecting lugs 7, which are passed through slots formed in the web of the boot body 1, and these lugs 7 are secured by rivets 8 to the flanges of said boot body. The spout passage 4, it will be noted, is located between the upper end portions of the boot legs 6. At their free ends, the boot legs 6 are provided with rearwardly projecting ears 9, one of which is larger than the other, and the projecting end of which is perforated to afford means to attach the drag chain 10. A wedge shape spacing block 11, as shown, of circular form is placed between the ears 9 and a screw 12 is passed through the said spacing block and through one of the ears 9 and is screwed into the other ear. The purpose of this tapered wedge will presently be noted. In their lower ends the boot legs 6 are formed with square perforations 13 that receive the square shanks 14 of stub trunnions 15. These trunnions 15 adjacent to their square shanks 14, are formed with round journals 16 upon which the disks 5 are journaled. Flanged hubs 17 are riveted, or otherwise rigidly secured to the outer faces of the disks 5 and are journaled on the enlarged outer end portions of the trunnions 15, thereby very greatly increasing the bearing surfaces of the journal connection between the disk and boot leg. Short nutted bolts 18 serve to rigidly secure the stub trunnions 15 to the respective boot leg 6. By reference to Fig. 4, it will be noted, that these bolts 18 are provided with thin heads of large diameter that directly clamp the inner surfaces of the boot legs 6, while the nuts of the said bolts are located within cavities formed in the said trunnions. The hubs 17 are adapted to hold hard oil, or similar lubricating material, and to afford access thereto and to the nuts of the bolts 18, the said hubs are provided at their outer ends with large axial openings, normally closed by threaded plugs 19. The lower ends of the boot legs are set slightly at angle in an approximately horizontal plane, as best shown in Fig. 7, so that the disks 5 will be held in contact, approximately at the point marked Y on Fig. 1. As the disks are decreased in diameter by wear, the angular adjustment of the lower ends of the boot legs, in respect to each other, may be varied so as to maintain the engagement of the converging edges of the disks; and this adjustment may be easily accomplished by rotary adjustments of the wedge block 11. To prevent accidental slipping of the wedge block 11, it is, as shown, provided with serrated faces.

The seed is delivered between the disks and between the boot legs 6 by a telescopical extensible metallic delivery spout made up of tubular sections 20 and 21. The tube 21 is much longer than the tube 20 and telescopes through the same. The said tube 20 is extended through the spout passage 4 of the seed boot body 1, and is capable of limited rocking movements and of considerable vertical movements. The downward movement of the tube 20 is limited by a collar 22 thereon, while the upward movement thereof is limited by a stop 23, also secured thereon, (see Figs. 1 and 4). The long tube 21 extends from the overlying seed box and seed delivery device, not shown, but which are of standard or of any suitable construction. The lower end of the tube 21 is flanged for engagement with the inturned flange at the upper end of the tube 20. These flanges prevent the tube 21 from being drawn out of the tube 20 and cause the tube 20 to rise in the boot body 1 when the disks are dropped downward in extreme positions. When the disks are raised, the tube 21 may telescope downward through the tube 20 farther than shown in Fig. 1. The seed delivery tube is, therefore, universally adjustable to all movements which will be given to the disks.

The numeral 24 indicates a lug secured to the rear portion of the seed boot body 1 and to which the usual presser rod 25 may be attached.

By reference to Figs. 1 and 4, it will be noted, that completely free and open space is afforded between the disk journals so that seed delivered from the spout 21 may freely drop directly to the bottom of the furrow. Otherwise stated, the space at the inwardly projecting axes of the disk journals is free and unobstructed for the downward passage of the grain or seed.

As is evident, the construction above described eliminates castings in the construction of the seed boot and provides a seed boot which may be cheaply constructed from sheet steel and which will be lighter and, at the same time, much stronger and more durable than the cast seed boot. Furthermore, the use of pressed or forged steel or iron makes possible construction which cannot be produced in the casting.

Hitherto, it has been customary to attach the drag chain to the portion of the body of the seed boot. By attaching the chain to the lower portion of the boot leg, the chain is protected by the disks so that it will not become entangled with old corn stalks and weeds. Furthermore, it enables a shorter chain to be used and gives a low point of draft which causes the chain to engage the ground closer to the disks.

What I claim is:

1. A double disk attachment comprising a boot body and laterally spaced sheet metal boot legs rigidly secured to said body at their upper ends, converging disks journaled to the lower portions of said legs, and an adjustable spacing device connecting the lower ends of said legs at a point horizontally off-set from the projecting axes of the disks, whereby the converging edges of said disks may be kept in engagement when reduced in size by wear.

2. A double disk attachment comprising a seed boot having laterally spaced depending sheet metal legs, forwarding converging disks journaled to the lower end portions of said legs, and an adjustable spacing device connecting the lower end portions of said legs at a point at the rear of the projecting axes of the disks, whereby the converging front edges of said disks may be kept in engagement, when reduced in size by wear.

3. A double disk attachment comprising a boot body having laterally spaced depending sheet metal legs secured to the upper ends of said body, converging disks journaled to the lower portions of said legs, a rotatively adjustable wedge shaped spacing block interposed between the lower portions of said legs at a point horizontally offset from the projected axes of the disks, and a screw for rigidly clamping the wedge engaging portions of said legs onto the said wedge block, substantially as described.

4. A seed boot for disk drills comprising a pressed sheet metal boot body and a pair of separately formed sheet metal boot legs having lugs at their upper ends passed upward through perforations in said boot body and secured thereto by rivets.

5. A seed boot for disk drills comprising a curved and tapered channel shaped pressed steel boot body, and laterally spaced spring steel boot legs secured to the body and flanges of said body and depending therefrom.

6. In a double disk attachment, the combination with a seed boot having laterally spaced depending legs and converging disks journaled to said legs, of a telescopically adjustable metallic seed delivery spout comprising a tube section extending through the upper portion of said boot between said disks and mounted with freedom for oscillatory and vertical movements therein, and a second tube section telescoped into the first tube section, substantially as described.

7. A double disk attachment comprising a seed boot having laterally spaced depending legs of resilient material independently secured to the boot body, whereby the resiliency of each leg is independent of that of the other leg, and disks journaled thereto, said disks being located outside of said legs, the space between said disks, intersectioned by a vertical line and by the inwardly projecting axes of said disks being entirely free and unobstructed.

8. In a device of the kind described, comprising a curved and tapered channel shaped pressed metal boot body, laterally spaced legs secured at their upper ends to said boot body, and disks located outside of said legs and journaled to the lower portions thereof.

9. A double disk attachment comprising a pressed channeled sheet metal boot body having its flanges on its upper side, laterally spaced sheet metal boot legs rigidly secured to said body at their upper ends, and disks located outside of said legs and journaled thereto.

10. A seed boot for drills comprising a channel shaped pressed sheet metal boot body having its flanges on its upper side, and laterally spaced depending spring metal boot legs rigidly secured thereto at their upper ends, and disks located outside of said legs and journaled thereto.

11. A seed boot for disk drills comprising a pressed channel sheet metal boot body tapered in width in the direction from its rear toward its front end, and laterally spaced depending spring metal boot legs rigidly secured thereto at their upper ends.

12. A seed boot for disk drills comprising a pressed channeled sheet metal boot body tapered in width in the direction from its rear toward its front end, and having its flanges on its upper side, and laterally spaced depending metal boot legs rigidly secured thereto at their upper ends.

In testimony whereof I affix my signature in presence of two witnesses.

OTTO G. RIESKE.

Witnesses:
HARRY D. KILGORE,
F. D. MERCHANT.

---

Copies of this patent may be obtained for five cents each, by addressing the "Commissioner of Patents, Washington, D. C."